United States Patent [19]
Perreault

[11] 3,771,844
[45] Nov. 13, 1973

[54] ENDLESS TRACK HAVING REPLACEABLE TRANSVERSE RODS

[75] Inventor: Jules Perreault, Valcourt, Quebec, Canada

[73] Assignee: Bombardier Limited, Valcourt, Quebec, Canada

[22] Filed: Feb. 17, 1972

[21] Appl. No.: 227,562

[30] Foreign Application Priority Data
Feb. 3, 1972 Canada.......................... 133,919

[52] U.S. Cl. ................................................. 305/38
[51] Int. Cl............................................ B62d 55/24
[58] Field of Search..................... 305/35 EB, 8, 37, 305/36

[56] References Cited
UNITED STATES PATENTS
2,899,242 8/1959 Bombardier .......................... 305/38
3,416,845 12/1968 Scanland.............................. 305/38
3,436,128 4/1969 Boulanger............................ 305/38

FOREIGN PATENTS OR APPLICATIONS
824,043 9/1969 Canada................................ 305/38

Primary Examiner—Richard J. Johnson
Attorney—Christopher Robinson et al.

[57] ABSTRACT

An endless track for a snowmobile or the like comprises a moulded rubber track belt which includes a series of transverse reinforcing rods embedded therein. The rods are encased in individual sheaths and the ends of each rod are accessible at the edges of the belt to permit the rods to be replaced when they become defective.

11 Claims, 4 Drawing Figures

PATENTED NOV 13 1973   3,771,844

ENDLESS TRACK HAVING REPLACEABLE TRANSVERSE RODS

BACKGROUND OF THE INVENTION

This invention relates to a new or improved construction of endless track for a motor driven vehicle, for example, a snowmobile track belt.

U. S. Pat. No. 2,899,242 Bombardier discloses an endless track which has been used commercially in snowmobiles for a number of years. That track comprises a wide flat belt, flexible in the longitudinal direction, and having two series of sprocket holes extending longitudinally thereon close to the lateral edges of the belt. The belt is stiffened against transverse flexure and longitudinal displacement of transversely aligned sprocket holes by means of transverse metal reinforcing rods. The reinforcing rods extend for substantially the full width of the belt, and are embedded in and bonded to the material of the belt by molding. Whilst track belts of this type are satisfactory in many respects, they suffer the disadvantage that the reinforcing rods are not replaceable should they be damaged or broken. Thus when one rod is broken, the rods immediately adjacent to it are subject to overloading so that they too are likely to fail prematurely, and the entire track belt may very soon be rendered unserviceable.

It is known to provide a snowmobile track belt with exterior cleats which can be replaced individually. However such track belts are not simple to manufacture, and in general do not give satisfactory operation in loose and deep snow conditions.

SUMMARY OF THE INVENTION

Accordingly it is an object of the invention to provide an endless track for a motor driven vehicle such as a snowmobile in which transverse reinforcing members are embedded in the track belt and yet are readily replaceable.

The invention therefore provides an endless track for a motor driven vehicle comprising a one-piece generally flat longitudinally flexible belt having a series of regularly spaced sprocket engaging means extending longitudinally therein, and stiffening means comprising a series of longitudinally spaced transversely extending elongate reinforcing members substantially completely embedded in said belt, means at opposite longitudinal edges of said belt providing access to the ends of said rods, said rods being selectively axially displaceable transversely of said belt whereby defective rods may be replaced, preferably the reinforcing rods are not bonded to the material of the belt and can therefore be replaced. It has also been found that due to the lack of bonding between the reinforcing rods and the belt material, the longitudinal flexibility of the belt is enhanced.

Preferably the reinforcing members are smooth surfaced metal rods of any suitable cross-section and of a length slightly less than the transverse width of the belt, the rods being sheathed in a tubular fabric sleeve the ends of which are flattened and closed at the lateral edges of the belt. The elastic nature of the belt material permits the ends of the tubular envelopes to be distended to provide access for replacement of the rods. The rods are embedded substantially completely within the material of the belt and preferably have ends which are smoothly rounded to avoid damaging the belt when they are removed.

Although the present invention was developed with the object of facilitating replacement of broken reinforcing rods in a snowmobile track belt, an unexpected and all together surprising effect has been noted in that it has been found in practice that the frequency of failure of reinforcing rods in snowmobile track belts incorporating the present invention is dramatically reduced. The exact reason for this reduced failure rate is not fully understood and it can only be speculated that the absence of bonding between the reinforcing rods and the surrounding track material results in a reduction in the stresses applied to the reinforcing rods during operation.

BRIEF DESCRIPTION OF THE DRAWINGS

The invention will further be described, by way of example only, with reference to the accompanying drawings in which.

Figure 1:
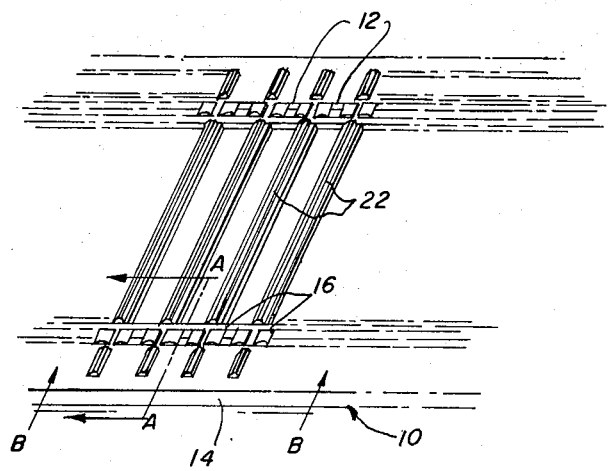
FIG. 1 is a fragmentary perspective view of a portion of a snow-mobile track belt inaccordance with this invention.
Figure 2:
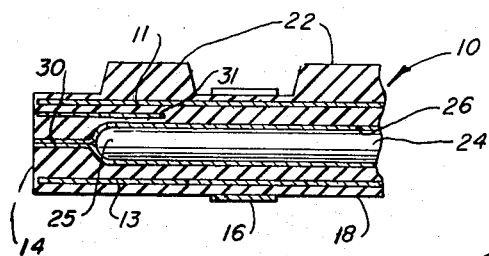
FIG. 2 is a sectional view taken on the line A—A in FIG. 1, the ground-engaging side of the belt being shown uppermost.
Figure 4:
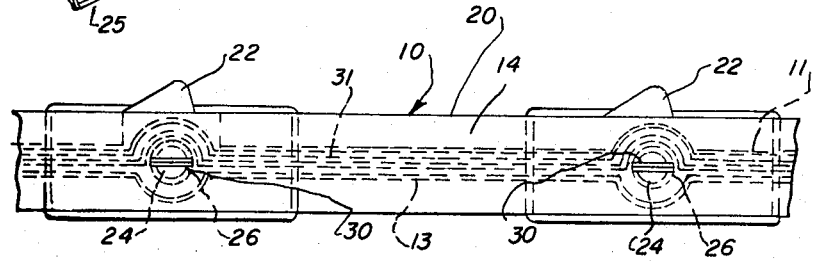
FIG. 4 is a fragmentary view taken in the direction of arrows B—B in FIG. 1.

An endless track as shown in FIGS. 1, 2 and 4 comprises a broad belt in accordance fabricated by molding layers of rubber or a rubber-like material, on either side of one or more layers 11, 13, of fabric webbing of a suitable natural or synthetic fiber, such as cotton or nylon, for example.

A longitudinally spaced series of sprocket-engaging means in the form of holes 12 is formed close to each longitudinal edge 14 of the belt for engagement by the sprocket teeth on the sprocket wheel of the motor driven vehicle (not shown). The sprocket holes 12 may be of any suitable shape; as illustrated they are generally square, the edges of the holes being reinforced and protected against wear by inserts 16 of suitable material. The invention is also applicable to tracks without sprocket holes therein, for example belts such as are shown in U.S. Pat. No. 3,451,728 Bruneau or Canadian Patent No. 825,637 Irgens, provided on the track inwardly projecting lugs for driving engagement with sprockets or drive wheels.

One side 18 of the belt is generally smooth and flat for engagement by rollers (not shown) associated with the driving sprocket and suspension of the motor driven vehicle; whilst the opposite side 20 of the belt is provided with a series of closely spaced transverse ribs 22, shown in end view in FIG. 4 molded in the belt. The ribs 22 form traction elements of the belt and are strengthened by reinforcing members such as rods 24, totally embedded therein.

The rods 24 are centrally positioned in the belt, and as shown in FIG. 2 have rounded ends 25 to avoid damaging the belt upon removal.

The belt 10 is flexible in its longitudinal direction, but the reinforcing rods 24 stiffen it against transverse flexure, and more particularly maintain the sprocket holes 12 at opposite sides of the belt in transverse alignment with each other.

Figure 3:
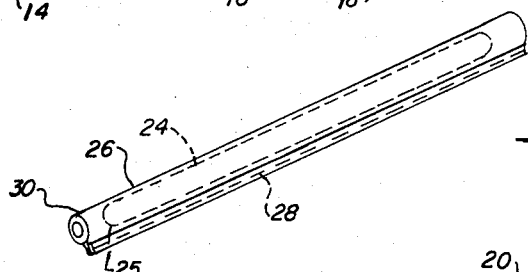
FIG. 3 is a view of a reinforcing rod and sleeve as used in the construction of the track belt shown in FIGS. 1, 2 and 4.

Whereas according to previous practice the transverse reinforcing rods have been bonded to the material of the belt during molding, in the illustrated embodiment of the present invention such bonding is prevented or at least limited, so that subsequently the reinforcing rods 24 can be removed from the belt and replaced. As shown in FIG. 3, prior to fabrication of the belts, each reinforcing rod 24 is inserted in a generally tubular sleeve 26. The sleeve may be of any suitable closely woven fabric of synthetic or natural fiber, for example cotton or nylon or of steel mesh, and may be formed from a strip of such fabric the longitudinal edges of which have been sewn together to form a seam as at 28 in FIG. 3. The reinforcing rods 24 are of a length slightly smaller than the width of the belt 10, whereas the sleeves 26 are of a length substantially equal to this width.

During fabrication of the belt the reinforcing rods 24 each encased in a sleeve 26 are molded into the rubber body of the belt at the required locations. In the finished belt as illustrated in FIGS. 2 and 4 the reinforcing rods are positioned within and strengthen the ribs 22. As will be particularly evident from FIG. 2, the rounded ends of the reinforcing rods 24 do not extend as far as the lateral edges of the belt. However each end portion 30 of the sleeves extends beyond the respective end of the reinforcing rod as far as the lateral edge of the belt. During the molding operation when the belt is fabricated these end portions 30 of the sleeves are flattened and closed. However due to the elastic nature of the material of the belt, each end 30 of the sleeves can readily be distended to provide access to the rods 24 for replacement. Upon insertion of a replacement rod, when the rod is correctly positioned centrally of the belt the rubber along the lateral edges of the belt by its resilience forces the ends of the sleeves to close.

If desired, during manufacture of the belt the ends 30 of the sleeves may be adapted to prevent ingress of dirt or moisture to the reinforcing rods 24 during operation by the provision of a sealing means which can readily be ruptured should it prove necessary to replace any particular rod. In addition to strengthen the belt in the region of the ends of the reinforcing members one or more plies 31, may be disposed in strips along the edges of the belt, molded therein between the rod ends and the ground-engaging surface of the track. To provide added strength at the edges of the belt, the material of the belt may be of increased thickness in this area.

In the finished condition the rods 24 within their sleeves 26 are closely surrounded and supported by the material of the belt, but are not bonded to this material so that they can later be removed and replaced if necessary. It will be appreciated that the nature of the fabric material of the sleeves 26 must be such as to prevent significant penetration of the material of the belt to the surfaces of the rod 24 during the molding operation.

In an alternative arrangement (not shown), instead of a full-length sleeve 26, each rod may be provided with two short sleeves spaced apart at opposite ends of the rod. This arrangement still provides for access to both ends of the reinforcing members but the intermediate portions of the latter may be in direct contact with the material of the belt, e.g. rubber. As a further alternative the sleeves 26 or the short sleeves may be of a steel wire mesh material instead of natural or synthetic fiber. It will be appreciated that the reinforcing members 24 need not comprise cylindrical rods as illustrated, but can be of any suitable cross-section such as oblong, square, rectangular, triangular, oval, etc. In certain cases each reinforcing member could comprise two or more superimposed strips of rigid resilient material such as spring steel.

What I claim as my invention is:

1. An endless track for a motor driven vehicle comprising a one-piece generally flat longitudinally flexible belt having a series of regularly spaced sprocket engaging means extending longitudinally therein, and stiffening means comprising a series of longitudinally spaced transversely extending elongate reinforcing members substantially completely embedded in said belt, each said reinforcing member being encapsulated in a sheath of flexible material which prevents, or at least limits, bonding of the reinforcing member to the material of the belt during moulding, means at opposite longitudinal edges of said belt providing access to the ends of said rods, said rods being selectively axially displaceable transversely of said belt whereby defective rods may be replaced.

2. An endless track for a motor driven vehicle comprising a one-piece generally flat longitudinally flexible belt having a series of regularly spaced sprocket engaging means extending longitudinally therein, and stiffening means comprising a series of longitudinally spaced transversely extending elongate generally rigid reinforcing rods substantially completely embedded in said belt, said reinforcing rods each being of a length less than the transverse width of the belt and each being centrally located with respect to the transverse direction of said belt, said belt, at least in the longitudinal edge portions thereof being of an elastic material, means at opposite longitudinal edges of said belt providing access to the ends of said rods, said access means comprising slit means in the edge portions of said belt registering with the ends of each rod, each said slit means being elastically distendable to permit passage of a rod therethrough, said rods being selectively axially displaceable transversely of said belt whereby defective rods may be replaced.

3. An endless track according to claim 2 wherein each rod is of a rigid material having a degree of resilience.

4. An endless track according to claim 3 wherein each rod has ends which are smoothly rounded to avoid damage to the track upon removal of a rod.

5. An endless track according to claim 4 wherein each rod is of non-circular generally flattened form in cross-section.

6. An endless track according to claim 4 wherein in assembled form each end of each rod is encapsulated in an individual sheath of flexible material, each rod having an intermediate portion which is directly contacted by the material of the track.

7. An endless track according to claim 4 wherein each rod is of generally circular cross-section.

8. An endless track according to claim 2 wherein when in assembled form said reinforcing member is at least partially encapsulated in a closely fitting sheath of flexible material.

9. An endless track according to claim 2 wherein said belt is substantially flat on one side, the opposite side displaying a series of transverse ribs, each said reinforcing member being embedded in a respective one of said ribs.

10. An endless track according to claim 2 wherein each sheath is a closely woven fabric of natural or synthetic fibre, each reinforcing member being of a length less than the transverse width of the belt and being centrally positioned therein, each sheath extending beyond the ends of its respective reinforcing member substantially to the longitudinal edges of the belt, the ends of the sheath being embedded in the edge portions of the belt in closed flattened form but being distendable by elastic deformation of said edge portions to provide said means providing access to the ends of the reinforcing member.

11. An endless track for a motor driven vehicle comprising a generally flat one-piece longitudinally flexible belt of rubber like material having a series of regularly spaced sprocket engaging means extending longitudinally thereon close to each lateral edge thereof, stiffening means comprising a series of longitudinally spaced transversely extending metal reinforcing rods embedded in said belt, each said rod being enclosed in a sleeve of flexible fabric, each said rod being of a length slightly less than the width of said belt and being centrally arranged therein, each sleeve having end portions extending beyond the respective ends of the corresponding rod substantially as far as the longitudinal edges of the belt, the end portions of each sleeve being in a flattened and closed condition, but being distendable by elastic distortion of the edge portions of said belt to provide access to the ends of said rods, said rods being selectively axially displaceable transversely of said belt whereby defective rods may be replaced.

* * * * *